(12) United States Patent
Wilson

(10) Patent No.: US 12,505,527 B2
(45) Date of Patent: Dec. 23, 2025

(54) SYSTEM AND METHOD FOR DEFECT DETECTION USING VISIBLE LIGHT CAMERAS WITH SYNCHRONIZED LIGHTING

(71) Applicant: EIGEN INNOVATIONS INC., Fredericton (CA)

(72) Inventor: Jacob Wilson, Fredericton (CA)

(73) Assignee: EIGEN INNOVATIONS INC., Fredericton (CA)

( * ) Notice: Subject to any disclaimer, the term of this patent is extended or adjusted under 35 U.S.C. 154(b) by 34 days.

(21) Appl. No.: 18/681,432

(22) PCT Filed: Aug. 5, 2022

(86) PCT No.: PCT/CA2022/051200
§ 371 (c)(1),
(2) Date: Feb. 5, 2024

(87) PCT Pub. No.: WO2023/010222
PCT Pub. Date: Feb. 9, 2023

(65) Prior Publication Data
US 2024/0354930 A1    Oct. 24, 2024

Related U.S. Application Data

(60) Provisional application No. 63/229,892, filed on Aug. 5, 2021.

(51) Int. Cl.
*G06T 7/00*     (2017.01)
*G01N 21/88*    (2006.01)
*G01N 33/00*    (2006.01)
*H04N 23/56*    (2023.01)

(52) U.S. Cl.
CPC ....... *G06T 7/0004* (2013.01); *G01N 21/8806* (2013.01); *G01N 33/0078* (2024.05); *H04N 23/56* (2023.01); *G01N 2021/8887* (2013.01); *G06T 2207/10152* (2013.01); *G06T 2207/30108* (2013.01)

(58) Field of Classification Search
CPC ........ G06T 7/0004; G06T 2207/10152; G06T 2207/30108; G01N 21/8806; G01N 33/0078; G01N 2021/8887; G01N 2021/8411; G01N 2021/8883; G01N 21/8851; H04N 23/56
See application file for complete search history.

(56) References Cited

U.S. PATENT DOCUMENTS

| | | |
|---|---|---|
| 5,477,268 A | 12/1995 | Shimbara et al. |
| 5,815,198 A | 9/1998 | Vachtsevanos et al. |
| 2002/0093647 A1 | 7/2002 | Fukazawa et al. |
| 2002/0093648 A1 | 7/2002 | Nikoonahad et al. |
| 2008/0055591 A1 | 3/2008 | Walton |

(Continued)

*Primary Examiner* — Nasim N Nirjhar

(57) ABSTRACT

System and method that includes: projecting a dynamic lighting pattern from a controlled lighting device towards a manufactured object; capturing a light response of the object, over an inspection period, to the dynamic lighting pattern and generating a set of image frames representing the captured lighting response; processing the set of image frames to generate an intensity image that is based on intensity information across a plurality of the image frames; assigning a quality label based on the generated intensity image.

13 Claims, 13 Drawing Sheets

(56) References Cited

U.S. PATENT DOCUMENTS

| | | |
|---|---|---|
| 2011/0273702 A1 | 11/2011 | Jones et al. |
| 2013/0114078 A1 | 5/2013 | Honda et al. |
| 2017/0023780 A1* | 1/2017 | Braker ................... G03B 37/06 |
| 2018/0348144 A1 | 12/2018 | Ando |
| 2019/0238796 A1* | 8/2019 | Allen ..................... H04N 7/181 |
| 2020/0134773 A1* | 4/2020 | Pinter ................ G01N 21/8806 |
| 2020/0209761 A1* | 7/2020 | Liebregts ............ G03F 7/70508 |
| 2020/0344449 A1 | 10/2020 | Allen et al. |
| 2022/0342316 A1* | 10/2022 | Kooiman ................ G06T 7/001 |

* cited by examiner

SYSTEM AND METHOD FOR DEFECT DETECTION USING VISIBLE LIGHT CAMERAS WITH SYNCHRONIZED LIGHTING

RELATED APPLICATIONS

This application is a National Phase Entry of International PCT Patent Application No. PCT/CA2022/051200 filed on Aug. 5, 2022 designating the United States and claims the benefit of and priority to U.S. Provisional Patent Application No. 63/229,892, dated Aug. 5, 2021, entitled: SYSTEM AND METHOD FOR DEFECT DETECTION USING VISIBLE LIGHT CAMERAS WITH SYNCHRONIZED LIGHTING", incorporated herein by reference

FIELD

This disclosure relates generally to imaging systems applied to industrial inspections.

BACKGROUND

Many manufacturing processes repeatedly mass-produce specific parts that must meet defined quality criteria. Rapid detection of a defective part can enable the defective part to be removed from a supply chain at the lowest cost point possible and also enable corrective action to be taken to minimize future defects.

The cost of quality for industrial manufacturing, particularly costs associated with inspection and prevention, can negatively impact profitability. Highly automated, high volume industrial processes require extensive amounts of information to be captured and analyzed. In this regard, industrial imaging systems, including optical imaging systems, can be used to capture information about an industrial process for inspection and/or control purposes, and combined with computer vision and machine learning systems that aid in the analysis and processing of such information.

An imaging-based inspection system to detect non-trivial part defects can benefit from the use of advanced computer vision and machine learning-based classification algorithms that detect specific defects and/or anomalous data. For these systems, common issues such as part and image sensor pose variations, material property variations, image background variations and ambient or controlled lighting variations can significantly impact the effectiveness of classification algorithms. Further, collected image data may have embedded information about defects that is not readily apparent from the raw image data.

Accordingly, there is a need for an intelligent inspection system that can extract useful information from raw image data to improve inspection accuracy and also minimize the occurrence of and the impact of variations that occur during an industrial inspection process.

SUMMARY

According to a first example aspect, a computer implemented method and system is described for inspecting a manufactured object, the method including positioning the object in a stationary pose relative to a controlled lighting device and an image sensor device; projecting a predefined dynamic lighting pattern from the controlled lighting device towards the object; capturing, by the image sensor device, lighting responses of the object to the dynamic lighting pattern and generating a set of image frames representing the captured lighting responses; processing the set of image frames to generate a processed intensity image that is based on intensity information from a plurality of the image frames; and assigning a classification for the object based on the processed intensity image.

In some examples of the first example aspect, each image frame in the set of image frames comprises an array of pixels, wherein each aligned group of pixels across the set of image frames indicates a respective light intensity value measured in respect of a corresponding point of the object, and processing the set of image frames to generate the processed intensity image comprises determining a processed intensity value for each aligned group of pixels based on changes in the respective light intensity values indicated within the aligned group of pixels, the processed intensity image comprising an array of the processed intensity values.

In some examples of the first example aspect, the processed intensity value for each aligned group of pixels is an intensity magnitude value that indicates a difference between a highest light intensity value measured in respect of a corresponding point of the object and the lowest light intensity value measured in respect of the corresponding point.

In some examples of the first example aspect, the processed intensity value for each aligned group of pixels is an intensity gradient value that indicates a rate of change in intensity values measured in respect of a corresponding point of the object.

In some examples of the first example aspect, each image frame in the set of image frames comprises an array of pixels, wherein each aligned group of pixels across the set of image frames indicates a respective light intensity value measured in respect of a corresponding point of the object, and processing the set of image frames to generate the processed intensity image comprises generating a first processed intensity image and a second processed intensity image. Generating the first processed intensity image comprises: determining an intensity magnitude value for each aligned group of pixels that indicates a difference between a highest light intensity value measured in respect of a corresponding point of the object and the lowest light intensity value measured in respect of the corresponding point, the first processed intensity image comprising an array of the intensity magnitude values. Generating the second processed intensity image comprises: determining an intensity gradient value for each aligned group of pixels that indicates a rate of change in the light intensity values measured in respect of a corresponding point of the object, the second processed intensity image comprising an array of the intensity gradient values.

In one or more of the preceding examples, assigning a classification comprises assigning one or more labels based on the first processed intensity image and the second processed intensity image.

In one or more of the preceding examples, the predefined dynamic lighting pattern is displayed by a display screen or a digital projector that faces a surface of interest of the object.

In one or more of the preceding examples, projecting the predefined dynamic lighting pattern comprises reflecting, using a reflecting surface that is directed towards the object, the dynamic lighting pattern as projected by a dynamic pattern lighting source.

In one or more of the preceding examples, the reflecting surface is a curved surface.

In one or more of the preceding examples, the predefined dynamic lighting pattern comprises display pattern that is shifted at a defined rate.

In one or more of the preceding examples, the defined rate of shifting the display pattern is synchronized to a rate at which the light response is captured to generate the image frames in the set of image frames.

In one or more of the preceding examples, the display pattern comprises a repeating pattern that is static between shifts.

In one or more of the preceding examples, the display pattern comprises a sequence of different light wavelength pattern elements.

In one or more of the preceding examples, the sequence of different light wavelength pattern elements includes parallel bars of different colors.

In one or more of the preceding examples, the sequence of different light wavelength pattern elements consists of alternating white and black elements.

In one or more of the preceding examples, the sequence of different light wavelength pattern elements includes a set of parallel curved bars of different colors.

In one or more of the preceding examples, capturing the light response of the object comprises measuring light reflected from a surface of the object.

In one or more of the preceding examples, capturing the light response of the object comprises measuring light transmitted through a region of the object.

In one or more of the preceding examples, assigning the classification for the object comprises applying a classification model to assign a quality label based on the processed intensity image.

According to a further example aspect is a computer implemented method for inspecting a mass produced object, including: projecting a dynamic lighting pattern from a controlled lighting device towards the object; capturing a light response of the object, over an inspection period, to the dynamic lighting pattern and generating a set of image frames representing the captured lighting response; processing the set of image frames to generate an intensity image that is based on intensity information across a plurality of the image frames; and assigning a quality label based on the generated intensity image.

According to a further aspect is a system for implementing the method of any one the preceding examples, including the image sensor device for generating the image frames; the controlled lighting device; and one or more processing units coupled to the image sensor device and the controlled lighting device, the one or more processing units each comprising a processing device and a storage device storing instructions for the processing device, the instructions collectively configuring the one or more processing units to perform the method of any one of preceding examples.

According to a third aspect, a system for performing an inspection of an object in an industrial process is disclosed that includes: a controlled lighting source generating a sequence of varying images for illuminating the object for an inspection duration; an image sensor device generating a sequence of captured image frames that measure a response of the object to the sequence of varying images; an image processing module generating, based on the sequence of captured image frames, a representative image that quantizes the response of the object across a plurality of the sequence of varying images; and a trained classification model assigning a classification for the object based on the representative image.

In some examples of the third aspect, the representative image comprises a plurality of pixels that are each assigned a value that indicates a change in an intensity of a measured light reflected from a respective point of the object across the plurality of the sequence of varying images.

In some examples of the third aspect, the representative image comprises a plurality of pixels that are each assigned a value that indicates a rate of change in an intensity of a measured light reflected from a respective point of the object across the plurality of the sequence of varying images.

In some examples of the third aspect, the controlled lighting source comprises a digital display or projector directed towards a location of the object.

In some examples of the third aspect, the controlled lighting source comprises a projector directed towards a reflective surface that is independent of the projector and configured to reflect the sequence of varying images towards a location of the object.

In some examples of the third aspect, the sequence of varying images collectively provide a dynamic lighting pattern that comprises a pattern of visual elements that are sequentially shifted in subsequent images of the sequence of varying images.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
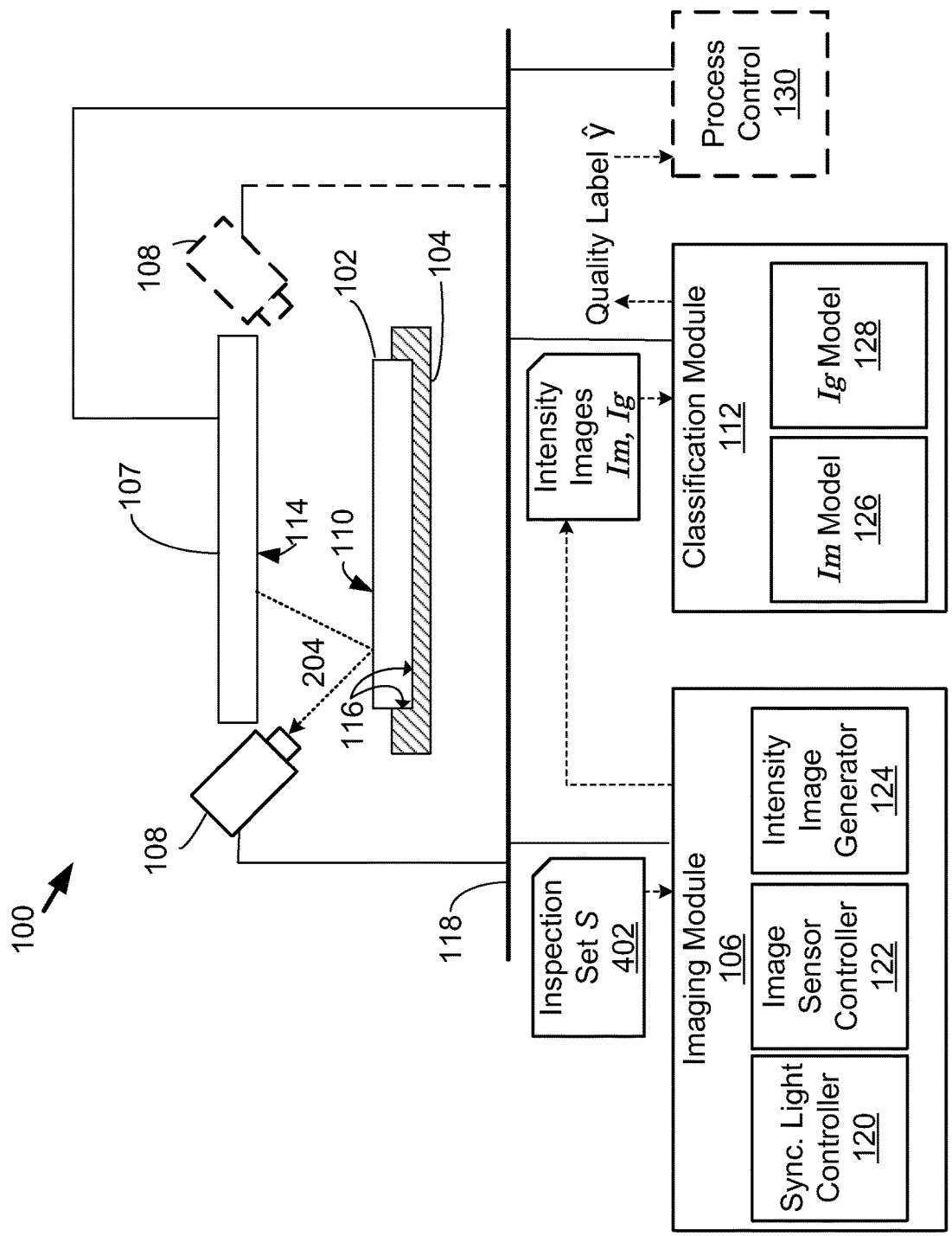
FIG. 1 is a block diagram illustrating an intelligent inspection system according to example embodiments.

This disclosure presents systems and methods that apply image analysis techniques to improve the performance of inspection and process control tasks related to industrial processes such as manufacturing processes. Methodologies and systems are disclosed for generating processed intensity images that can, in some scenarios, highlight certain types of defects that can enable the use of computer vision or predictive machine learning tools to detect and classify the defects and enable real-time online part quality inspection In this regard, FIG. 1 presents a schematic view of an industrial inspection system 100 that can be used to inspect a target object 102, which may for example be a mass produced manufactured part. In example embodiments, the elements of inspection system 100 include at least one image sensor device 108, a controlled lighting device 107 (also referred to as a controlled lighting source), an imaging module 106, and a classification module 112. As used in this disclosure, a "module" can refer to a combination of a hardware processing circuit and machine-readable instructions and data (software and/or firmware) executable on the hardware processing circuit. A hardware processing circuit can include any or some combination of a microprocessor, a core of a multi-core microprocessor, a general processing unit, a graphical processing unit, a microcontroller, a programmable integrated circuit, a programmable gate array, a digital signal processor, or another hardware processing circuit.

In example embodiments, image sensor device 108, controlled lighting device 107, imaging module 106, and classification module 112 may be located at an industrial process location or site and enabled to communicate with an enterprise or local communications network 118 that includes wireless links (e.g. a wireless local area network such as WI-FI™ or personal area network such as Bluetooth™), wired links (e.g. Ethernet, universal serial bus, network switching components, and/or routers, and/or a combination of wireless and wireless communication links.

In some examples, imaging module 106 and classification module 112 are implemented using suitably configured processor enabled computer devices or systems such as one or more personal computers, industrial computers, laptop computers, computer servers and programmable logic controllers. In some examples, individual modules may be implemented using a dedicated processor enabled computer device, in some examples multiple modules may be implemented using a common processor enabled computer device, and in some examples the functions of individual modules may be distributed among multiple processor enabled computer devices. Further information regarding example processor enabled computer device configurations will be described below.

In the example of FIG. 1, inspection system 100 is configured to inspect a highly reflective or semi-reflective surface 110 of the target object 102. For example, the target object 102 can be a plastic part (for example an injection molded part), a glass part, a ceramic part, a metallic part, or other type of part that has a glossy, shiny, or otherwise reflective surface 110. Inspection station 100 is configured to detect defects in target object 102 based on inspection sets 402 of image frames that are generated by image sensor device 108 in response to a dynamic lighting pattern 204 that is projected onto the target object surface 110 by controlled lighting device 107. Inspection sets 402 generated by the image sensor device 108 are processed by imaging module 106 to generate respective intensity images/that are in turn processed by classification module 112. Classification module 112 can apply one or more classification functions, for example, one or more machine learning (ML) based models, to assign one or more classifications (e.g., quality labels $\hat{y}$) to the target object 102 based on one or more intensity images I In examples, the quality labels $\hat{y}$ can be assigned from a set Y of possible candidate quality classifications. For example, the quality label $\hat{y}$ assigned to a target object 102 may be: (1) "PASS", corresponding to a target object 102 (e.g., manufactured part) that has no detected defects; or one or more of: (2) "STRUCTURAL SURFACE DEFECT", corresponding to a target object 102 that has a structural or geometric defect on its surface that impacts the object's aesthetics or material properties (for example, a scratch or other topical surface defect); (3) "COSMETIC SURFACE DEFECT" corresponding to a cosmetic defect embedded in a surface material of a target object 102 that impacts the object's aesthetics (for example a splay defect in an injection molded part) and (4) "STRUCTURAL INTERIOR DEFECT" corresponding to a defect in an interior of target object 102 that impacts the object's aesthetics or material properties (for example a read-through defect resulting from a surface coating material being applied over an imperfect first-shot material in a dual-shot injection molding process).

In the inspection system 100 of FIG. 1, the image sensor device 108, controlled lighting device 107 and target object 102 are all maintained in an effectively stationary position relative to each other for an inspection period $T_I$. In this regard, target object 102 can be supported by a support structure 104 so that a surface 110 of the target object 102 is positioned, during the inspection period $T_I$, in a stationary target object pose (e.g., a known three-dimensional orientation and position) relative to the image sensor 108 and a projecting surface 114 of the controlled lighting device 107. In some examples, the support structure 104 may include a set of restraining surfaces or elements 116 that are configured to hold the target object 102 in the predefined target object pose. For example, the restraining elements 116 may form a nest or seat that receives the target object 102 and maintains it in the defined target object pose. In this regard, the inspection system 100 is configured to enable a consistent target object pose relative to image sensor 108 and the projecting surface 114 of the controlled lighting device 107 for multiple successive target object inspections over the course of multiple part inspection cycles of a mass-production process. In some examples, target object 102 can be positioned into the predefined target object pose within support structure 102 automatically by an assembly line robot or other automated placement tool. In some examples, target object 102 can be manually positioned into the predefined pose within support structure 102.

Figure 2:
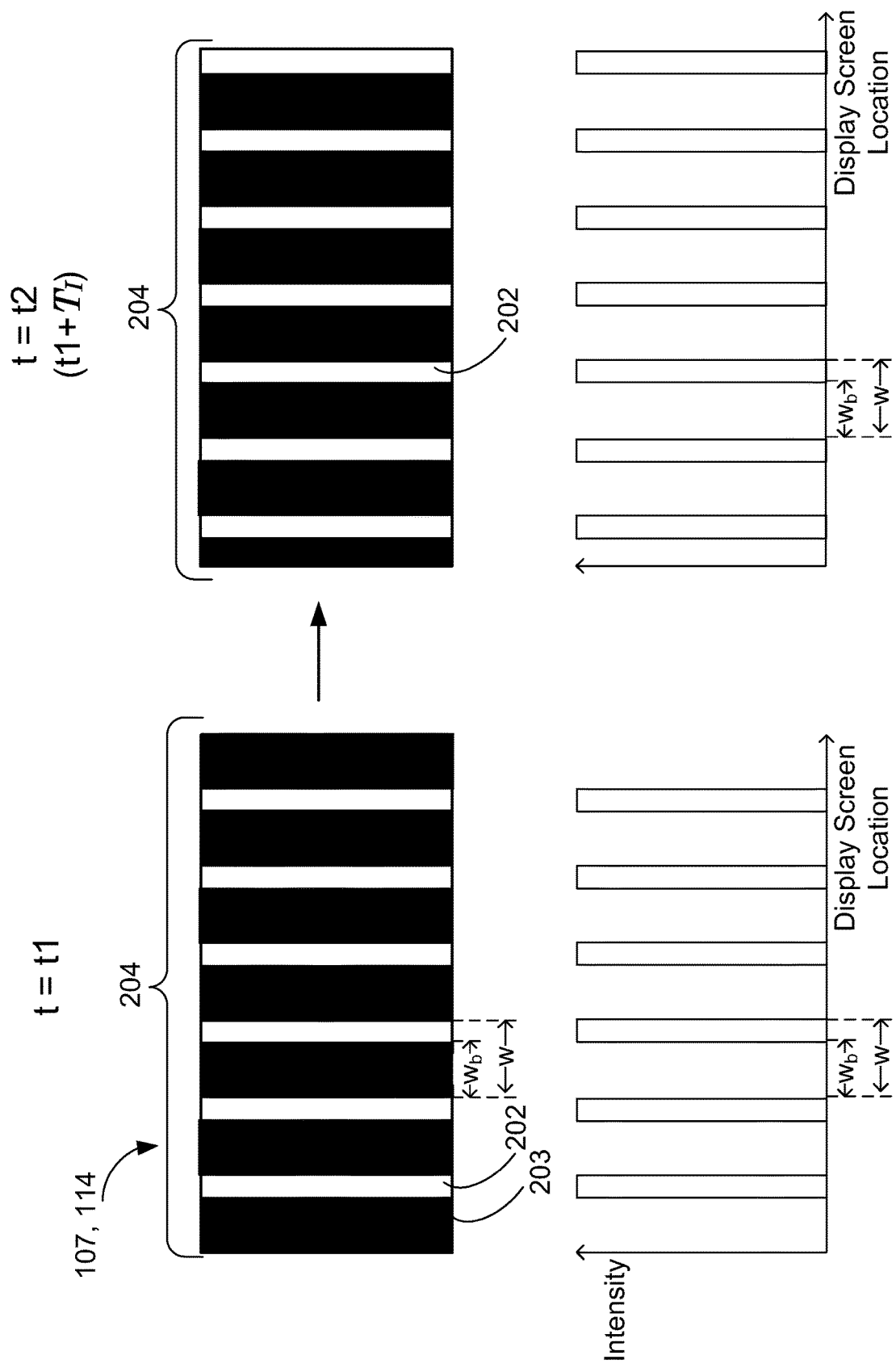
FIG. 2 illustrates a dynamic illumination pattern that is projected by an illumination device of the inspection system of FIG. 1.

Controlled lighting device 107 is controlled by synchronized lighting controller 120 that may, for example, be integrated into imaging module 106. Controlled lighting device 107 is configured to project controlled lighting conditions onto the surface 110 of target object 102. With reference to FIG. 2, in an example embodiment the controlled lighting device 107 is a digital display device that has an integrated processor and a planar liquid crystal display (LCD) screen or light emitting diode (LED) display screen 114 that comprises an array of display pixels that can be individually controlled to emit light. The array of display pixels can be collectively controlled to emit a dynamic lighting pattern 204. By way of non-limiting example, controlled lighting device 107 could be implemented using a 4K digital display device having 48" diagonal display screen 114 that is positioned to face towards the surface 110 of target object 102. It will be appreciated that other configurations and sizes of displays can be used to implement display screen 114 in other example inspection scenarios.

In the example of FIG. 2, dynamic lighting pattern 204 is a dynamic illumination mask that comprises a repeating set of alternating, parallel black bars 203 and white bars 202. The synchronized lighting controller 120 is configured to horizontally shift the lighting pattern 204 on the display screen 114 to the right at a constant rate over the inspection period $T_I$. The lighting pattern 204 wraps to the left edge of the screen 114 once it reaches the right edge. In this regard, FIG. 2 shows dynamic lighting pattern 204 at a first time $t=t_1$ and at a second time $t=t_2$, during which the labelled black bar 203 and white bar 202 have left-shifted a distance corresponding to 1.5 cycles, where image movement that equals the combined width "w" of an adjacent black bar 203 and white bar 202 corresponds to one cycle. In the illustrated example, the width of each black bar 203 is "$w_b$", and the width of each white bar 202 is "$w-w_b$". FIG. 2 includes respective intensity plots corresponding to the intensity of light projected at different screen width locations by the dynamic lighting pattern 204 at first time $t=t_1$ and second time $t=t_2$. 30. Accordingly, in example embodiments controlled lighting device 107 generates a sequence of varying images that collectively provide a dynamic lighting pattern that comprises a pattern of visual elements that are sequentially shifted in subsequent images of the sequence of varying images.

In example embodiments, image sensor device 108 is an optical image video camera that includes a sensor for measuring a pixelated array of received light intensity values. Image sensor device 108 has integrated image processing functionality to generate image frames that represent visible light from screen 114 reflected by the surface 110 of target object 102. In the illustrated example of FIG. 1, a single image sensor device 108 is shown, however in some examples multiple synchronized image sensor devices 108 may be used if required to generate image frames that represent an entire region of interest of the target object 102.

Image sensor device 108 is configured to generate image frames corresponding to captured light intensity data at a defined rate of multiple frames per second (for example, a frame rate of r Hz), with each image frame being an m by n array of pixel values that each correspond to a measured light intensity. Operating properties of the image sensor device 108, for example frame rate and resolution, may be controlled by an image sensor controller 122 that can be part of imaging module 106. In example embodiments, synchronized lighting controller 120 and image sensor controller 122 communicate to synchronize operation of the controlled lighting device 107 and image sensor device 108. For example, the controlled lighting device 107 is configured to shift the dynamic lighting pattern 204 on display screen 114 at a pattern shift rate that corresponds to the image sensor device frame rate of r Hz. Pattern shift rate can refer to the rate at which each pattern element corresponding to a display pixel is shifted, step wise, by one or more display screen pixels, from a first display screen pixel location to a second display screen pixel location as the pattern moves, e.g., horizontal pattern shift rate in the pattern of FIG. 2). Thus, in an example of the present disclosure, the pattern shift rate of dynamic lighting pattern 204 is synchronized to the frame rate r Hz of image sensor device 108.

Figure 3:
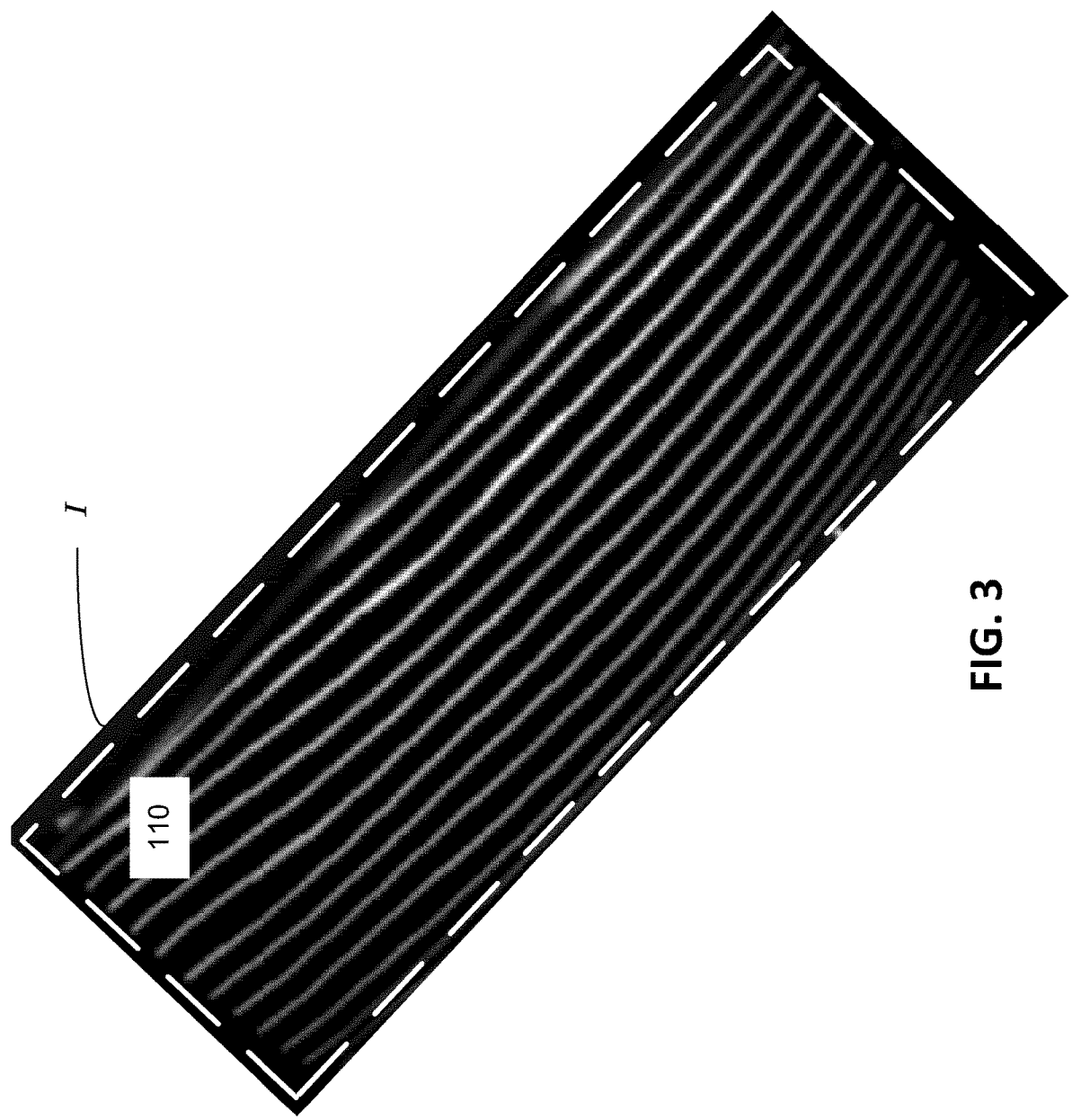
FIG. 3 illustrates an example of a reflection of a frame of a dynamic image pattern from a target object.

FIG. 3 illustrates a rendered example of a single image frame I generated in an example where a single image sensor device 108 captures images of the entire surface 110 of a target object 102. The white bars 202 of the lighting pattern 204 projected into surface 110 are captured by an image sensor device 108 as reflected bars of light. Over the course of the inspection period $T_I$, the movement of the lighting pattern 204 is synchronized with the frame rate of the image sensor device 108, such that regions of high and low lighting intensities corresponding to the black and white bars 203, 202 move along the object surface 110. Over the course of a single cycle w, each exposed point of the surface 110 will be exposed, from the perspective of pixel image sensor device 108, to a range of illumination intensities corresponding to the width of a black bar 203 and white bar 202.

Figure 4:
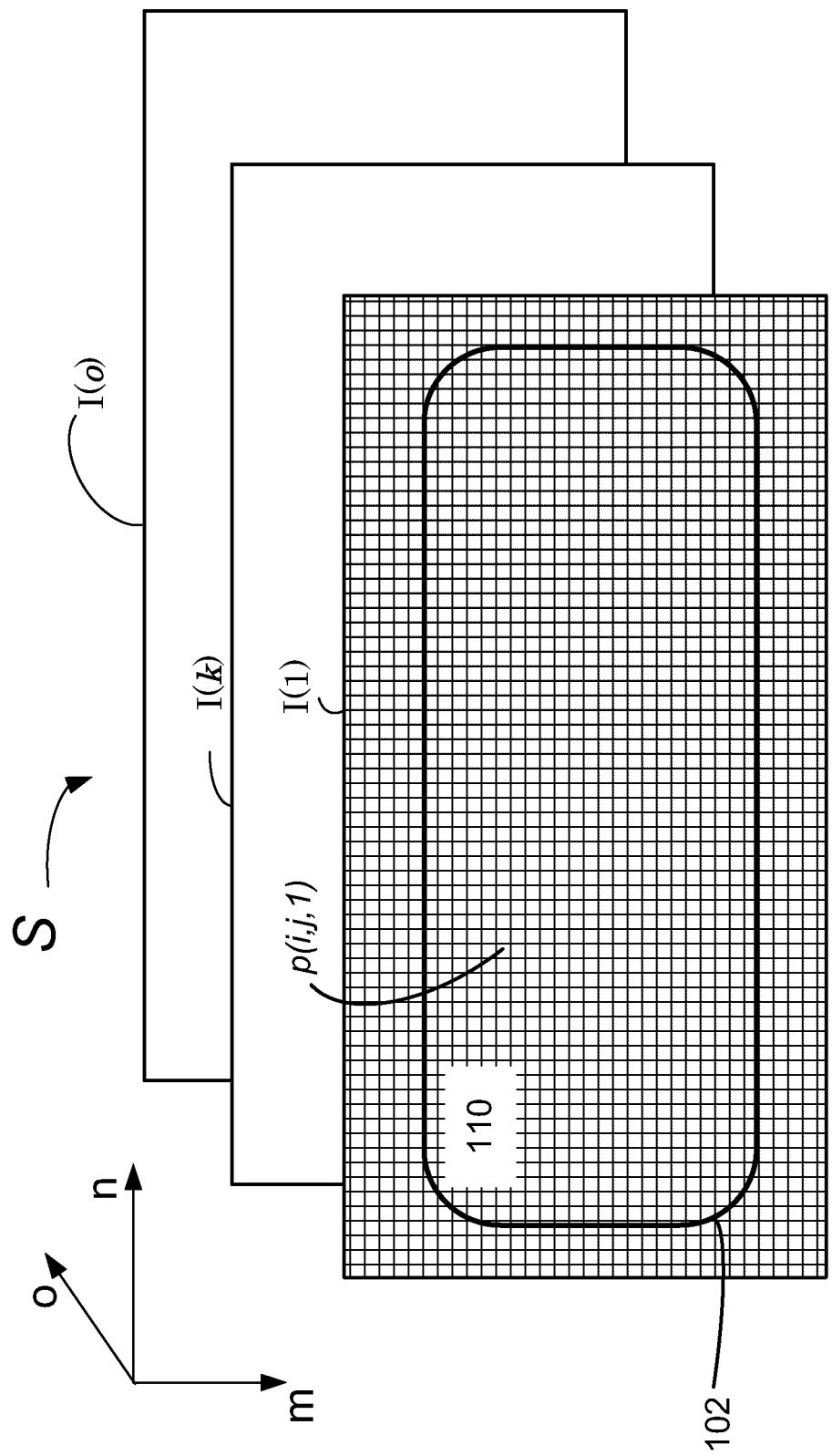
FIG. 4 shows an inspection set of image frames of the target object generated by an image sensing device of the inspection system of FIG. 1.

In one example, to ensure that each point of the surface 110 is illuminated across a complete range of intensities, the inspection period $T_I$ is set to correspond to 1.5 cycles. In some examples, the inspection period $T_I$ could be reduced to as little as 1 cycle, and in some examples may be increased to 2 or more cycles. With reference to FIG. 4, image sensor device 108 will generate a respective inspection set S 402 of image frames I(1) to I(o) for the inspection period $T_I$. The inspection set S 402 of image frames I(1) to I(o) provide a sequence of inspection images that measure a response of the target object 102 to the sequence of varying images that define the dynamic lighting pattern. Each image frame I(1) to I(o) includes an m by n matrix of pixels. Each pixel can be denoted as pixel p(i,j,k), where $1 \leq i \leq m$, $1 \leq j \leq n$ and $1 \leq k \leq o$, with each pixel being assigned one or more values that correspond to a measured light intensity. Each aligned group of pixels (i.e., the set of pixels having the same values for i and j) across the inspection set S 402 of image frames I(1) to I(o) represents the response of a corresponding point of the target object 102 (or a surrounding region) to the dynamic lighting pattern.

In some examples, each pixel can be assigned a set of RGB values, indicating a measured Red light intensity, Green light intensity and Blue light intensity. In a present example, each pixel is assigned a single grayscale intensity value by an internal processor of the image sensor device 108 that is between 0 (black, minimum) to 255 (white, maximum). For example, the image sensor device 108 may measure RGB intensity values for each pixel and then convert the three RGB intensity values into a single greyscale intensity value. Alternatively, image sensor device 108 may be a monochrome device configured to directly measure greyscale intensity values.

Figure 5:
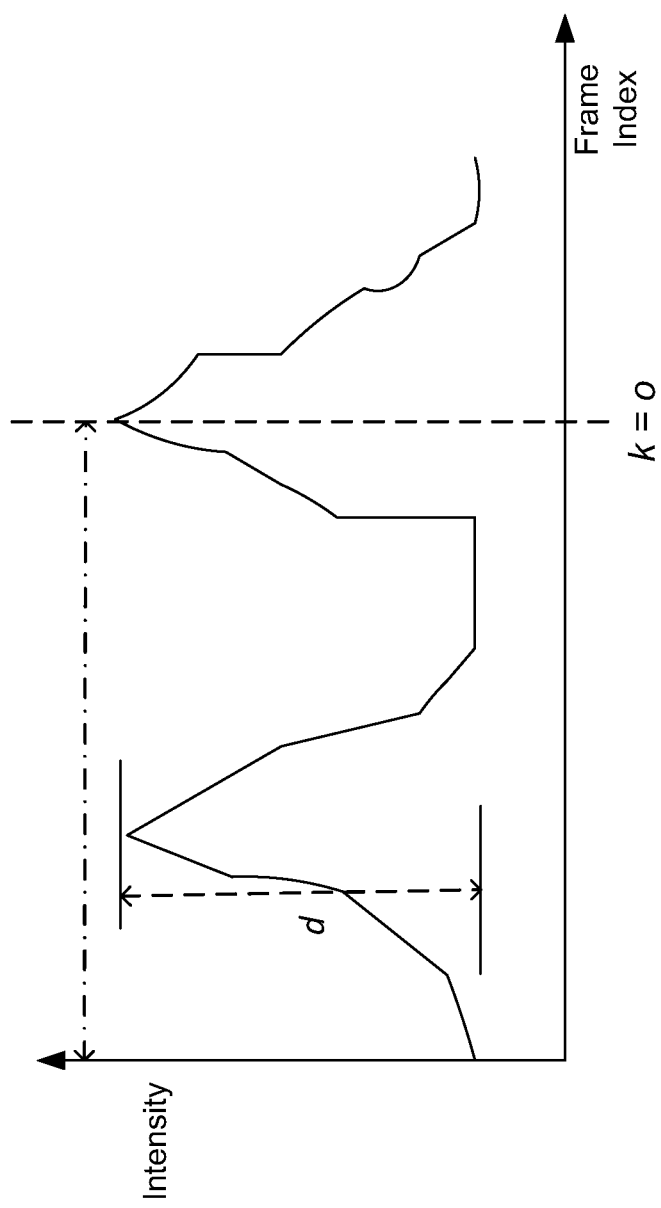
FIG. 5 is a plot of measured light intensity for a point on a surface of a target object in response to illumination by the dynamic illumination mask.

Over the duration of inspection period $T_I$, the shifting illumination mask generates an intensity waveform at each image sensor device pixel that corresponds to a point on the target object surface 110. FIG. 5 illustrates a greyscale intensity waveform for a single pixel p(i,j,k) for an inspection set S 402 of image frames I(1) to I(o), where i and j are constant and correspond to light reflected from a single point of the surface 110 over the inspection period $T_I$, and k is a frame index (FI) that progresses from 1 to o. The peak and trough of the intensity waveform correspond to the maximum and minimum intensities associated with the white and black bars 202, 203 respectively. In some examples, the cycle duration (w), thicknesses of the white bars 202 ($w-w_b$), and thickness of the black bars 203 ($w_b$) are predefined with an objective of minimizing the waveform width at the peak of the intensity waveform (which can be achieved by having thin white bars 202 relative and wide black bars 203) while at the same time preventing aliasing effects that can result from too narrow white bars. Minimizing the waveform width at the peak of the intensity waveform can facilitate measurement of a rate of change between peak and trough intensity values, which as described in greater detail below can provide a gradient that can enable detection of certain types of defects.

In examples, inspection parameters including inspection period $T_I$ and number of image frames (o) per inspection set S, cycle duration (w), image frame rate and pattern shift rate (r), thicknesses of the white bars 202 (w–$w_b$), and thickness of the black bars 203 ($w_b$) can be predefined to optimize specific inspection applications based on the inspection scenario. For example, cycle duration (w), image frame rate and pattern shift rate (r), thicknesses of the white bars 202 (w–$w_b$), and thickness of the black bars 203 ($w_b$) could be selected to optimize inspection results having regard to one or more of: image sensor device 108 resolution; lighting device 107 resolution; distances and relative poses of the image sensor device 108, lighting device 107 and target object 102; geometry and material of target object 102; defects types, shapes and sizes; image sensor device frame rate and pattern shift rate; and inspection period $T_I$.

Figure 6:
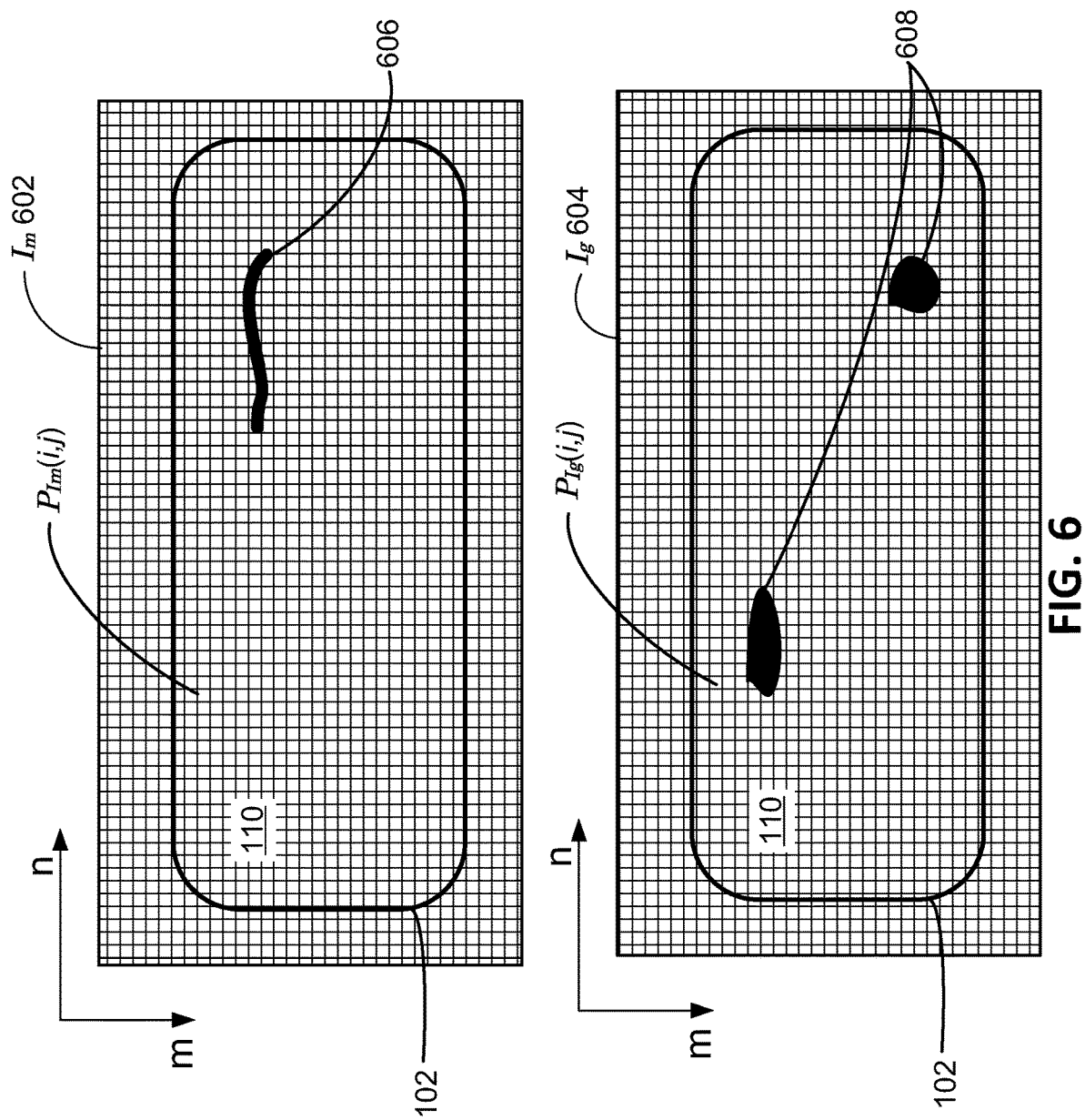
FIG. 6 shows a representation of an intensity magnitude image that is computed based on the set of combined raw images of the target object.

Accordingly, by the completion of an inspection period $T_I$, imaging module 106 has received an inspection set S 402 of image frames I(1) to I(o). In examples, the imaging module 106 includes an inspection image generator 124 that is configured to generate one or more inspection images that incorporate intensity information that is included in the inspection set S 402 of image frames I(1) to I(o). With reference to FIG. 6, in one example, the inspection image generator 124 is configured to generate two inspection images for each inspection set S 402, namely an intensity magnitude image $I_m$ 602 and an intensity gradient image $I_g$ 604. Intensity magnitude image $I_m$ 602 and intensity gradient image $I_g$ 604 are each representative images that each quantize a respective response of the target object across the sequence of varying images that make of the dynamic light pattern.

The set of image frames S 402 can be considered as an m×n×o array (i.e., a set of o greyscale image frames that each include m×n pixel values). The intensity magnitude image $I_m$ 602 is generated to describe the range in intensity that is associated with each pixel over the inspection period $T_I$. In particular, an intensity difference image $I_d$ is computed by determining, for each individual pixel p(i,j), an intensity difference value d between the minimum greyscale intensity value and the maximum greyscale intensity value that occurs for that pixel through the set of o greyscale image frames. An example of the intensity difference value d for a single pixel location is illustrated on the intensity waveform of FIG. 5. The resulting intensity difference image $I_d$ is an m×n two-dimensional array of intensity difference values d, with each array element corresponding to a respective pixel location. The m×n intensity difference image $I_d$ is then normalized, as indicated in equation (1) below, to generate m×n intensity magnitude image $I_M$ 602 with pixel magnitude intensity values in the rage of 0 to 255:

$$I_d = \max(S) - \min(S) \quad (1)$$
$$I_m = 255\left(\frac{I_d}{\max(I_d)}\right)$$

The intensity magnitude image $I_m$ 602 includes data that emphasizes target object properties associated with high and low levels of measured illumination intensities. In the case of a reflective surface 110, the high and low intensities correlate to high and low surface reflectance that can be attributed to surface texture and surface coating.

Intensity gradient image $I_g$ 604 is generated to describe a rate of change in the intensity that is associated with each pixel, which can provide insight into a localized geometry of the target object 102. In this regard, respective m×n×o horizontal and vertical gradient arrays, $S_h$ and $S_v$, respectively, are computed for the inspect set S of image frames as follows:

$$S_h(i, :, :) = \begin{cases} S(i+1, :, :) - S(i, :, :), & \text{for } i = 1, \ldots, m-1. \\ S(i, :, :) - S(i-1, :, :), & \text{for } i = m \end{cases} \quad (2)$$

$$S_v(:, j, :) = \begin{cases} S(:, j+1, :) - S(:, j, :), & \text{for } j = 1, \ldots, n-1. \\ S(:, j, :) - S(:, j-1, :), & \text{for } j = n \end{cases}$$

Intensity gradient image $I_g$ 604 is then obtained by computing the maximum 2-norm values of the horizontal and vertical gradient arrays, $S_h$ and $S_v$, along the $3^{rd}$ dimension (i.e., dimension corresponding to image frame index k) to generate an intermediate m×n image IN that is then normalized to provide m×n Intensity gradient image $I_g$ as a pixel array of intensity gradient values in the range of 0 to 255. These computations can be represented as follows:

$$I_n = \max\left(\sqrt{S_h(:, :, k)^2 + S_v(:, :, k)^2}\right) \text{ for } k = 1, \ldots, o. \quad (3)$$
$$I_g = 255(I_n/\max(I_n))$$

As illustrated in FIG. 6, the intensity magnitude image $I_m$ 602 and intensity gradient image $I_g$ 604 may highlight different types of defects based on the same set inspection S of image frames. For example, intensity magnitude image $I_m$ 602 includes a set of pixels 606 that include intensity magnitude values indicating a surface coating defect 606. Intensity gradient image $I_m$ 604 includes two sets of pixels 608 that include intensity gradient values indicating a defect under the surface coating. The intensity gradient image highlights specific part properties associated with high and low rate-of-change of illumination intensity. In example aspects, the high and low rates of change in intensity correlate with surface curvature, such that higher rates of change are attributed to greater changes in surface curvature.

The resulting intensity magnitude image $I_m$ 602 and intensity gradient image $I_g$ 604 are provided to classification module 112 for defect classification processing. In one example embodiment, classification module 112 includes an intensity magnitude-based classifier 126 configured to assign a classification label for target object 102 based on intensity magnitude image $I_m$ and an intensity gradient-based classifier 128 configured to assign a classification label for target object 102 based on intensity gradient image $I_g$. In example embodiments, intensity magnitude-based classifier 126 and intensity gradient-based classifier 128 are each implemented using respective trained machine learning (ML) based models that are configured to process the respective images and assign classification labels. In example embodiments, the machine learning (ML) based models that are used to implement intensity magnitude-based classifier 126 and intensity gradient-based classifier 128 each include a convolution neural network (CNN) model that has been trained to perform image classification using supervised training.

By way of example, intensity magnitude-based classifier 126 may be trained to assign one of three possible classifications based on the intensity magnitude image $I_m$ of target object 102: (1) "PASS", corresponding to a target object 102 that has no detected defects; or one or more of: (2) "STRUCTURAL SURFACE DEFECT", corresponding to a target object 102 that has a structural or geometric defect on its surface that impacts the object's aesthetics or material properties (for example, a scratch or other topical surface defect); (3) "COSMETIC SURFACE DEFECT" corresponding to a defect embedded in a surface material of a target object 102 that impacts the object's aesthetics (for example a splay defect in an injection molded part)

By way of example, intensity gradient-based classifier 128 may be more adept at detecting internal defects below a surface coating and thus may be trained to assign one of two possible classifications based on the intensity gradient image $I_g$ of target object 102: (1) "PASS", corresponding to a target object 102 that has no detected defects; and (4) "STRUCTURAL INTERIOR DEFECT" corresponding to a defect in an interior of target object 102 that impacts the object's aesthetics or material properties (for example a read-through defect resulting from a surface coating material being applied over an imperfect first-shot material in a dual-shot injection molding process).

In the case where both intensity magnitude-based classifier 126 and intensity gradient-based classifier 128 assign a "PASS" classification label to a target object 102, an overall "PASS" label will be assigned by classification module 112. In the case where either intensity magnitude-based classifier 126 or intensity gradient-based classifier 128 assign a classification label other than a "PASS", the classification module 112 will assign an overall "FAIL" label, along with the specific failing label(s) generated by the intensity magnitude-based classifier 126 and intensity gradient-based classifier 128.

In some examples, one or both of the machine learning (ML) based models that are used to implement intensity magnitude-based classifier 126 and intensity gradient-based classifier 128 may include a CNN model that has been trained to perform object detection and classification using supervised training. In such cases, each defect is treated as an "object" to be detected and classified, and the CNN models can output bounding box information that localizes as well as classifies the defects.

In some examples, the classification labels generated by classification module 112 can be logged and also provided to an industrial process controller 130 that is configured to take different actions based on the assigned labels including for example sending a message to activate a process control unit to route the part 102 in either a first direction or a second direction based on whether the assigned classification label is a "PASS" or "FAIL". The message may cause industrial process controller 130 to issue an alert message for an operator indicating a "failed" quality assessment. In some examples, process parameters (for example, one or more injection molding process setpoints) can be modified by industrial process controller 130 in response to the assigned labels.

Figure 7:
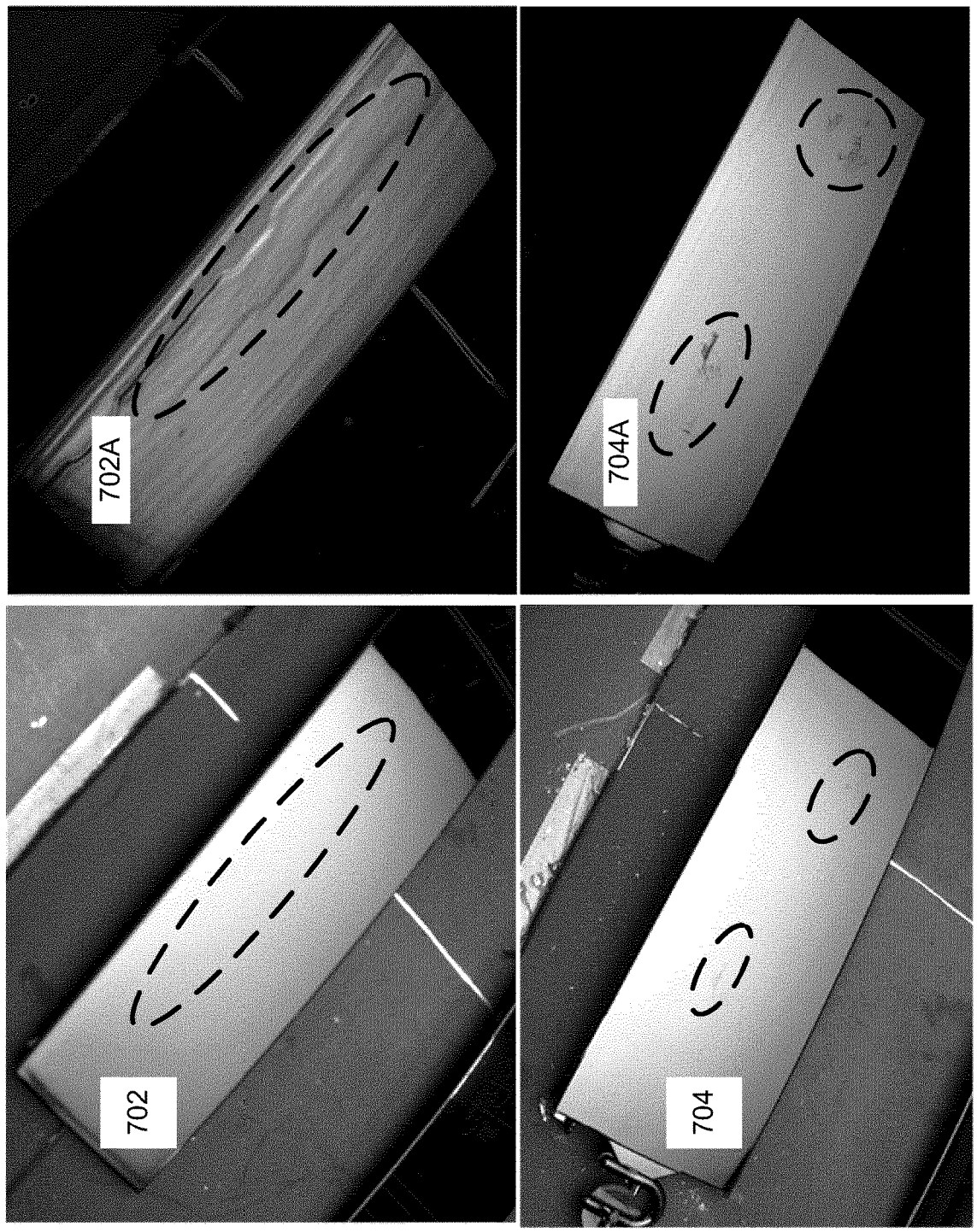
FIG. 7 shows examples of processed intensity magnitude images of a target object compared to conventional lighting images.

FIG. 7 shows images corresponding to an example application of inspection system 100 in the case of an injection molded part with a glossy black finish. The left column illustrates images 702, 704 that are generated for first and second parts, respectively, that are illuminated with conventional uniform inspection lighting. The right column image 702A is an intensity gradient image Ig of the first part based on an inspection set S of image frames generated in response to illumination of the first part by shifting dynamic lighting pattern 204 of alternating white bars and black bars projected on the first part by a display screen. As indicated by the dashed oval in images 702 and 702A, a surface defect (e.g., read-through) that is not apparent in the standard inspection image is readily visible in the intensity gradient image Ig. The right column image 704A is an intensity magnitude image Im of the second part based on an inspection set S of image frames generated in response to illumination of the first part by shifting dynamic lighting pattern 204 of alternating white bars and black bars projected on the second part by a display screen. As indicated by the dashed ovals in images 704 and 704A, internal defects (e.g., splay regions) that are not apparent in the standard inspection image are readily visible in the intensity magnitude image $I_m$. In the example of FIG. 7, the number of image frames o in inspection set S can be 24, by way of non-limiting example.

In summary, in the example of FIG. 7, a dynamic lighting pattern is provided by an LCD digital display screen that projects a mask onto a plastic injection moulded part with a high-gloss coating. The mask is a black screen having equidistant vertical white lines. An image sensing device in the form of a visible light camera records the surface of the part, thus capturing the reflected image of the projected illumination mask. In total, 24 frames are captured, each having the vertical lines shifted to the side by an equal distance. The frames cover the various inspection areas of the part such that a single point on the surface of the part is subjected to all levels of light intensity with the highest being when a vertical white line is shining directly on the surface thereof, and the dimmest being when the point is halfway between the projections of two adjacent vertical white lines. The reflections of the white lines off of the part surface when captured by the cameras are converted to intensity values and the resulting intensity value patterns are processed using the aforementioned methods to give the intensity magnitude and intensity gradient images of the part.

Figure 8:
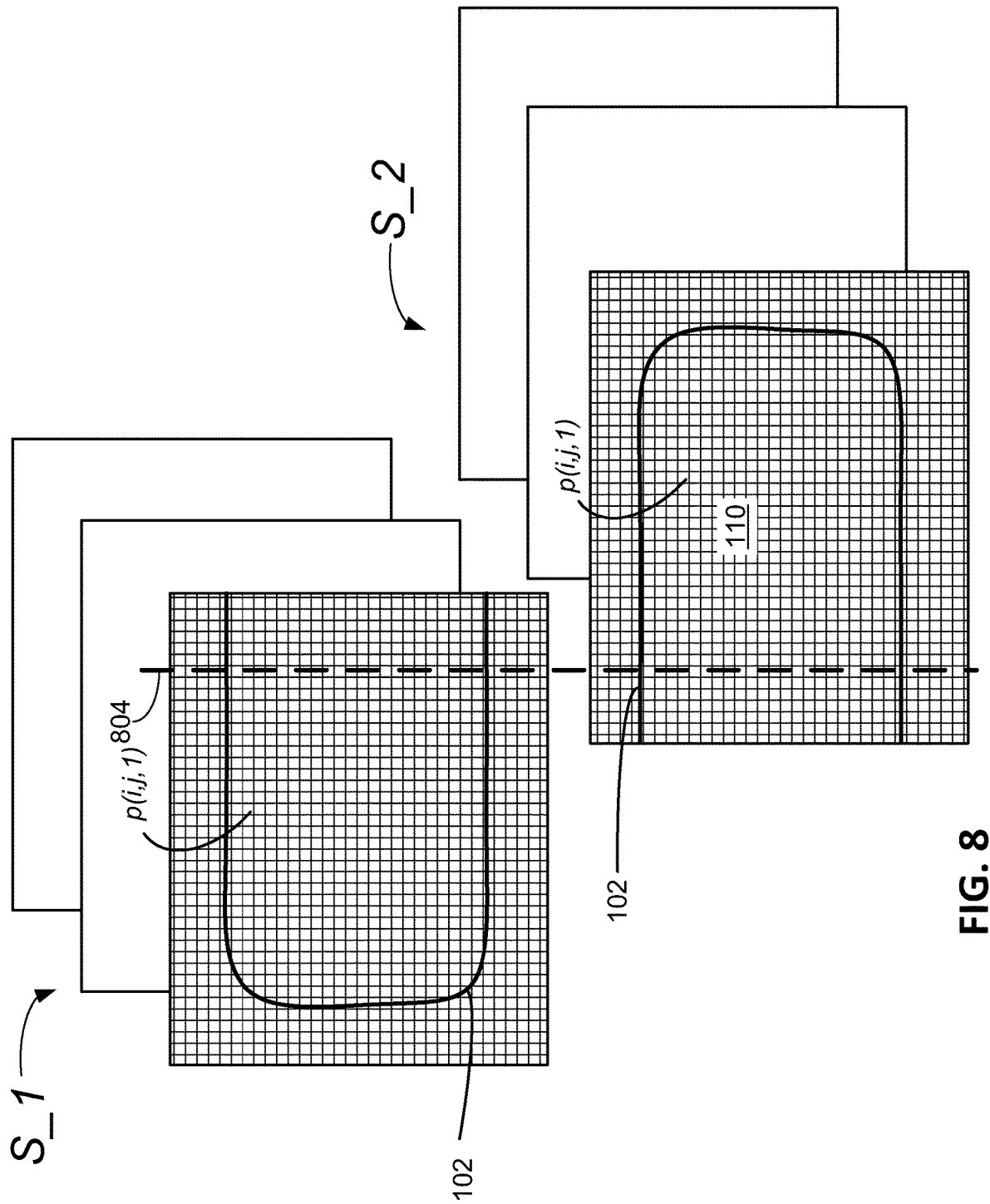
FIG. 8 shows multiple inspection sets of image frames of the target object generated by multiple image sensing devices of a further example of the inspection system of FIG. 1.

As noted above, in some applications multiple image sensor devices 108 may be required to provide complete coverage of a region of interest (e.g., surface 110) for a part 110, and in this regard FIG. 1 shows a second stationary image sensor device 108 in dashed lines. Each of the multiple image sensor devices can be configured to capture a respective inspection set of image frames of the target object 110. In this regard, FIG. 8 shows an example of a first inspection set S_1 of o image frames generated by a first image capture device 108 and a second inspection set S_2 of image frames generated by a second image capture device 108 of the surface 110 of an object 102 during an inspection period $T_I$ in response to dynamic illumination pattern 204.

In some examples, the multiple inspection sets S_1 and S_2 can be independently processed and labeled by imaging module 106 and classification module 112, enabling discrete labeling of different regions of part using image classification. For example, inspection sets S_1 and S_2 can be processed by imaging module 106 to generate respective intensity magnitude images $I_{m\_}1$ and $I_{m\_}2$ and intensity gradient images $I_{g\_}1$ and $I_{g\_}2$ that are each labeled by classification module 112.

However, in some examples the multiple inspection sets S_1 and S_2 may be merged to form a single inspection set S. For example, each of the respective frame images could be stitched together along a stitch line 804, and the resulting inspection set S processed by imaging module 106 to generate a respective intensity magnitude image $I_m$ and intensity gradient image $I_g$ that are labeled by classification module 112.

Although the projected dynamic lighting pattern is described above as alternating black and white bars as the visible wavelengths in a shifting sequence of different light wavelength pattern elements, different color wavelengths resulting in different color reflected bars could be projected by controlled lighting source 107. Different dynamic patterns could be used for different inspection scenarios. For example, colors of the illumination mask can be adjusted according to the material properties of the target object. Because the image sensor device is capturing the light from the illumination mask that is reflected by the part, the colors of the illumination mask can be tuned to maximize the reflectance of one color and also minimize the reflectance of another color. Further, the sizes of the respective bands can vary across the pattern. Additionally, patterns other than parallel bars can be used—for example, shifting concentric circles or other curved patterns. Thus, the predefined pattern can be tuned or the inspection scenario to which it is applied.

The system of FIG. 1 is an example of a deflectometry-based inspection system used to detect flaws in manufactured parts. Deflectometry can refer to a reflective surface measurement technique that can be used to amplify surface and subsurface characteristics of a part.

Figure 9:
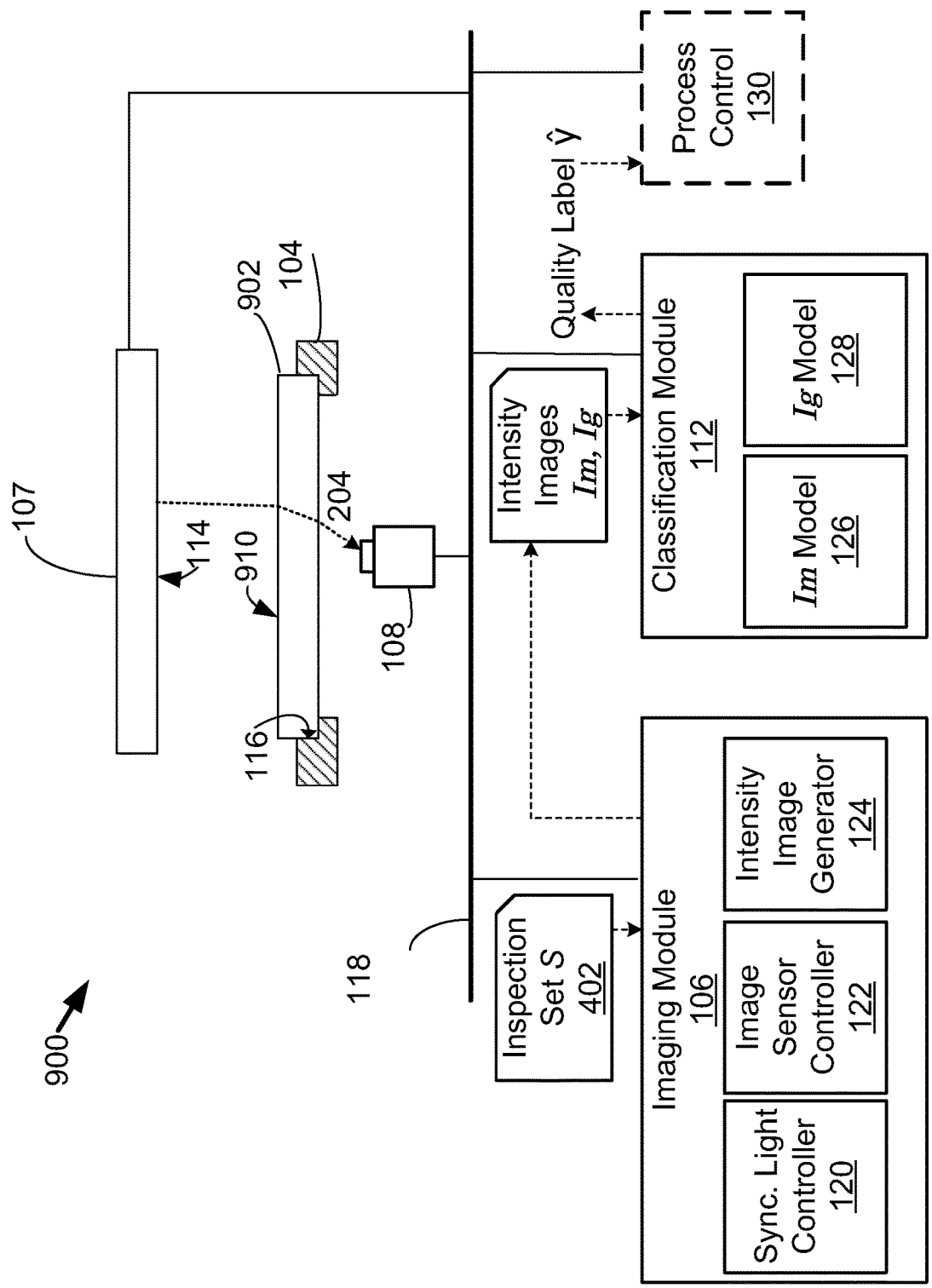
FIG. 9 is a block diagram illustrating a further example of an intelligent inspection system according to example embodiments.

In the above described examples, light reflectance from a non-transparent target object is captured. However, in alternative embodiments, the inspection system can be configured to perform defect detection in respect of transparent or semi-transparent target objects. In this regard, FIG. 9 shows an alternative example of an inspection system 900 that is identical to inspection system 100 described above except that in the case of inspection system 900 the at least one image sensor device 108 is positioned to receive a projected dynamic lighting pattern 204 that is transmitted through a transparent region of target object 902. In this regard, the controlled lighting device 107 is mounted on one side of target object 902 and image sensor device 108 is mounted on an opposite side. Target object 902 is secured by a support structure 104 that allows light projected by controlled lighting device 107 to be transmitted through the transparent region of the target object 902 and captured by image sensor device 108. The image sensor device 108 captures light transmitted through the target object corresponding to the projected dynamic lighting pattern 204 and generates a respective set S of inspection images. The set S of inspection images are processed to generate a respective intensity magnitude image $I_m$ and intensity gradient image Ig, which are then assigned classification labels, in the same manner as described above in respect of reflected light.

In the case of transparent parts, the high and low magnitude intensities can correlate with high and low transmittance that is attributed to voids, cracks, pits, etc. in the parts.

In some examples, aspects of inspection systems 100 and 900 can be combined to generate image sets for both reflected light and transmitted light by a target object that is both reflective and transmissive. In some examples, only one type of processed intensity image may be generated and classified, for example only an intensity magnitude image or an intensity gradient image.

On some example embodiments of systems 100 and 900, controlled lighting device 107 can take the form of a different light emitting structure than an flat screen dynamic image generating device such as an HD display screen; for example, a digital image projector could be used as controlled lighting device 107 to project dynamic lighting patterns on the object that is being inspected.

It is possible to extend the developed methodologies for the inspection of parts with low reflectivity. For parts with low reflectivity in the visible spectrum, the light emitted from a digital display can be used, with the illumination mask modified to increase the intensity of the illumination captured by the image sensor device camera. This can be accomplished, for example, by increasing the width of the white bars in the illumination mask pattern. In an example aspect, a single white bar is moved across the digital display to maximize the intensity of the illumination captured by the camera at localized regions of the part. The light emitted from a digital projection system can also be used to project higher intensity lighting onto the part. Furthermore, if a part contains optical brightening agents, a UV digital projection system can be used. Accordingly, in some examples infrared and/or ultraviolet light sources and image sensor devices can be used to supplement (replace) visible light based devices.

According to a first example aspect, a part, which has a glossy, shiny, or reflective surface (e.g., glass, plastic, ceramics, metals, etc.), is placed in a stationary nest and synchronized light is emitted from a digital display, located in front of or to the side of the part, to project controlled lighting conditions onto the part's surface. One or more stationary visible light cameras capture the reflected light from the part's surface. Each captured image has corresponding intensity patterns directly related to the synchronized lighting conditions. The resulting intensity patterns in the set of captured images are then processed using the techniques described herein to generate a single composite image that computer vision tools or a predictive machine learning model can analyze to determine the presence of particular defects in reflective parts.

According to a second example aspect, a part, which is made from a transparent material (e.g., glass, plastic, ceramics, etc.), is placed in a stationary nest and synchronized light is emitted from a digital display, located behind or to the side of the part, to illuminate the part under controlled lighting conditions. One or more stationary visible light cameras capture the synchronized light transmitted through the part. Each captured image has corresponding intensity patterns directly related to the synchronized lighting conditions. The resulting intensity patterns in the set of captured images are then processed using the techniques described herein to generate a single composite image that computer vision tools or a predictive machine learning model can analyze to determine the presence of particular defects in transparent parts.

In systems 100 and 900 as illustrated in FIGS. 1 and 9 respectively, controlled lighting device 107 has an integrated projecting surface 114 that projects a predefined dynamic lighting pattern directly towards the target object 102, with one or more image sensor devices 108 measuring a direct reflection by the target object 102 from the originating light source. In some alternative example implementations, an indirect dynamic light projection system may be used to project the dynamic lighting pattern onto target objects. In such systems, the controlled lighting device includes a primary dynamic lighting pattern source that is directed to a reflecting surface that in turn reflects the dynamic lighting pattern to project it towards the target object 102.

Figure 10:
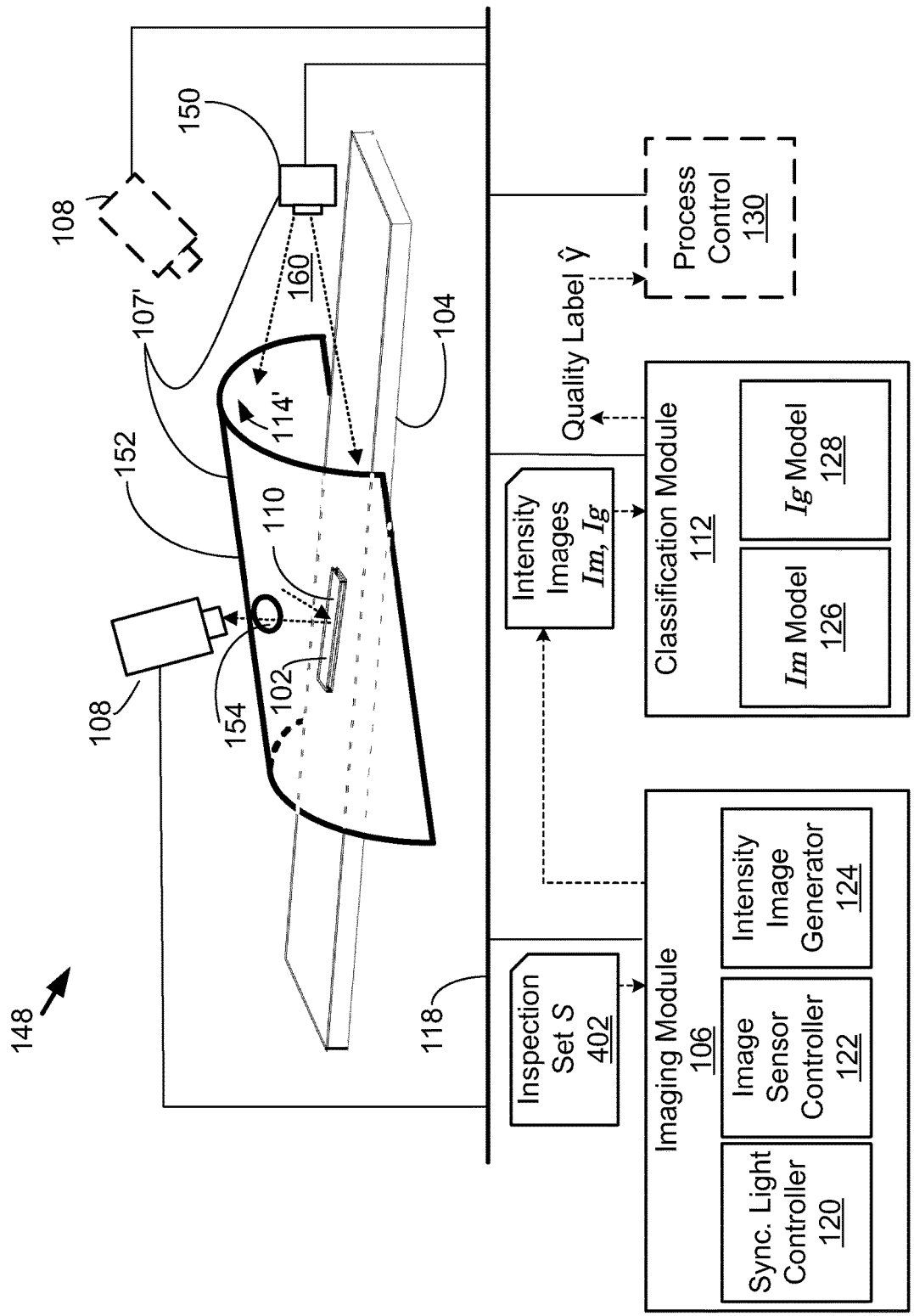
FIG. 10 is a block diagram illustrating a further example of an intelligent inspection system according to example embodiments.
Figure 11:
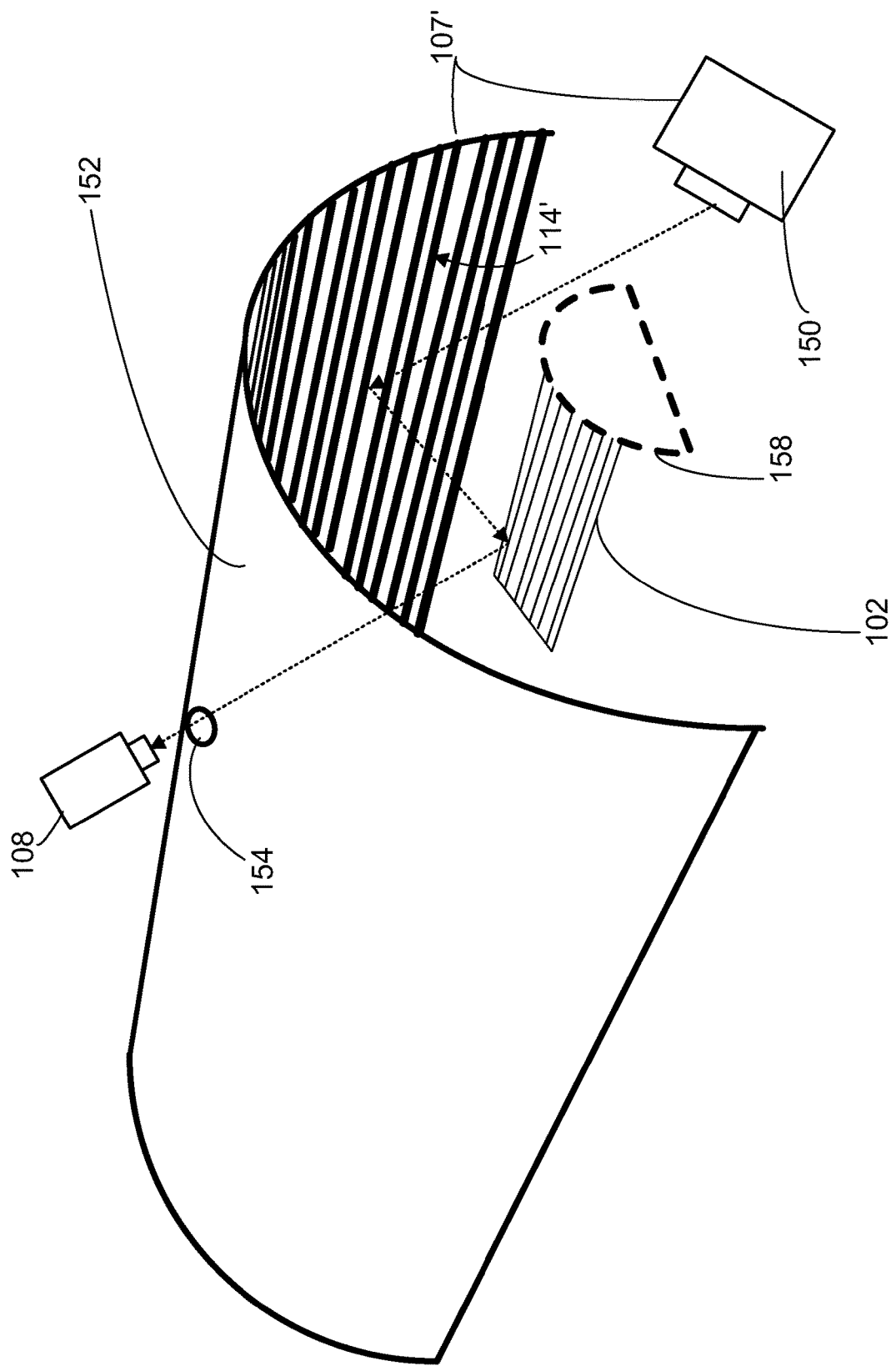
FIG. 11 is a block diagram illustrating components of a controlled lighting device of the intelligent inspection system of FIG. 10.

In this regard, FIG. 10 illustrates an example of a an indirect-reflection intelligent inspection system 148, which is similar to system 100 except that the direct projection controlled lighting device 107 has been replaced with and indirect projection controlled lighting device 107' (also shown in FIG. 11). The controlled lighting device 107' include an originating dynamic lighting pattern source 150, which may for example be a high definition video image projector, and a reflecting structure 152 that is provided with a light reflecting surface 114'. In operation, dynamic lighting pattern source 150 generates a dynamic lighting pattern such as described above and projects the lighting pattern towards a reflecting surface 114' of the reflecting structure 152. The reflecting surface 114' reflects the dynamic lighting pattern towards the surface of the target object 102. At least one image sensor device 108 is positioned to capture a set S of inspection images 402 that measure light reflected from the target object 102 in response to the dynamic lighting pattern that is projected onto the target object via the reflecting surface 114'. As indicated in FIGS. 10 and 11, in some examples, image sensor device 108 may be aligned with a portal or opening 154 provided through the reflecting structure 152 to capture light reflected from the target object 102.

In the illustrated implementation of system 148, the reflecting structure 152 defines a tunnel-like concave reflecting surface 114' that is positioned adjacent to and partially encircling the target object support surface 104. The use of a curved reflecting surface can, in some implementations, enable improved reflection coverage of a target object 102 by providing a wider illuminated area than possible with a directly projected dynamic light pattern. This can, in some applications, enable reflections of the dynamic lighting pattern to be measured simultaneously from one or surfaces of a non-flat target object 102. In example embodiments, different image sensor devices 108 can be positioned to capture reflections of the projected dynamic lighting pattern from different surface regions of the target object 102, in a manner similar to that described above in respect of FIG. 8.

In some examples, the support surface 104 may be a conveyor belt that is controlled by the process control module 130, in cooperation with the imaging module 106, to advance the target object 102 into a predefined inspection location under the reflecting structure 152. Once the target object 102 is in the inspection location, the target object 102 remains stationary relative to the controlled lighting device 107' (i.e., lighting pattern source 150 and reflecting structure 152) as well as the one or more images sensor devices 108, enabling the set S of inspection images 402 to be captured for processing by the imaging module 106 and classification module 112.

In example embodiments, the curved reflecting surface 114' of the reflecting structure 152 can be coated with a reflecting surface coating (for example projector paint) that enables the reflecting structure 152 to provide high contrast illumination with minimal glare. In example implementations, the curvature, size and shape of the reflecting structure 152 can be custom designed for the inspection task that it is intended to perform. In some examples, reflecting structure 152 and the other components of the inspection system 148 can be retrofitted to an existing conveyor system.

Figure 12:
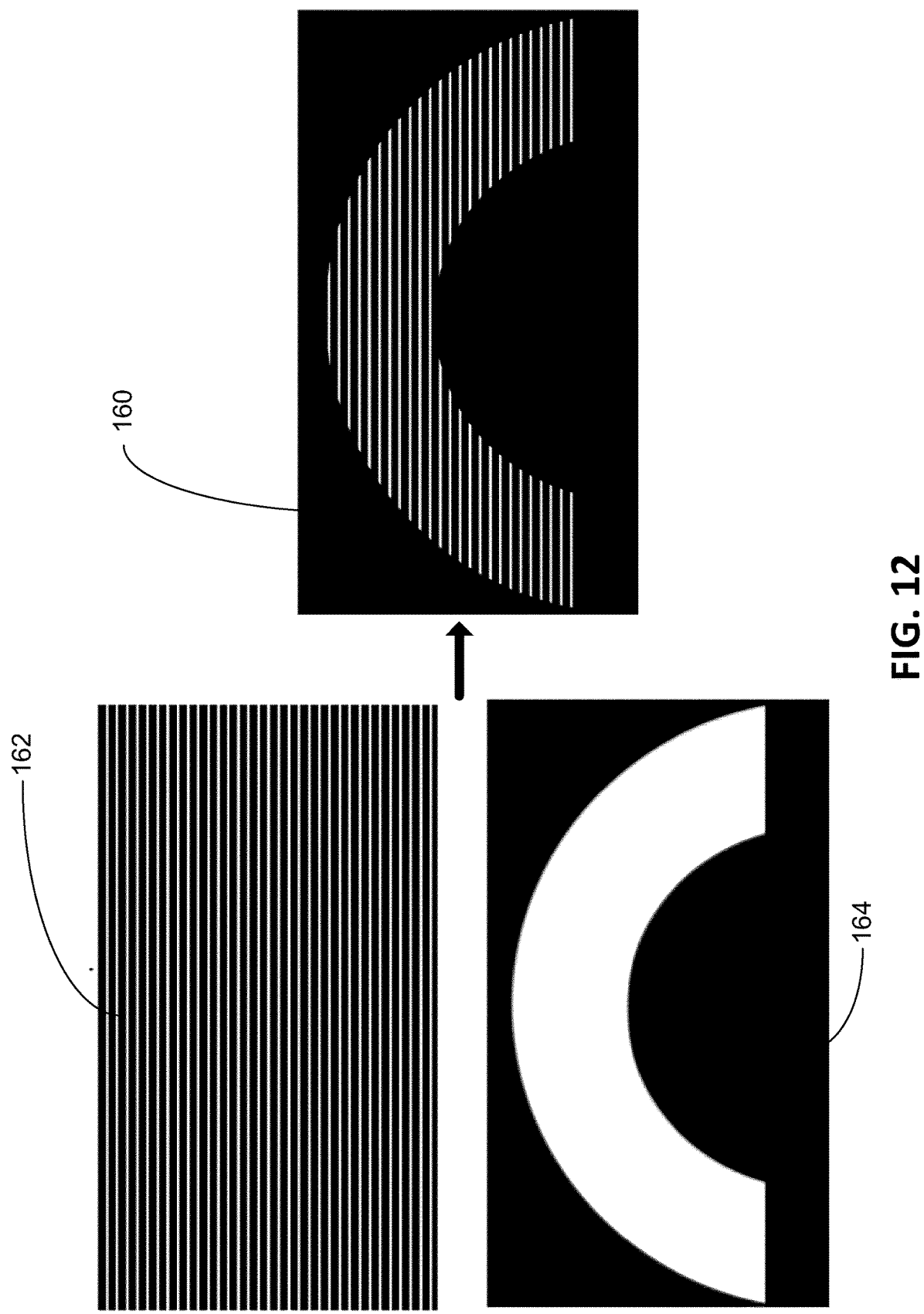
FIG. 12 is a schematic diagram showing an example of an image frame of a dynamic lighting pattern generated for use in the intelligent inspection system of FIG. 10.

FIG. 12 illustrates an example of a single image 160 from the sequence of image frames that make up a dynamic light pattern (for example dynamic lighting pattern 204) as projected by lighting pattern source 150. In an example embodiment. In example embodiments, an unmasked dynamic lighting pattern (represented for example by image 162) is selected from a set of predefined patterns for the intended inspection task. The imaging module 106 may be configured to apply a mask 164 to the images 162 of the dynamic lighting pattern to restrict the projected illumination from the lighting pattern source 150 to the curved reflecting surface 114' of the reflecting structure 152, thereby eliminating or mitigating direct lighting of the target part 102.

With reference to FIG. 11, in some example implementations a physical illumination shroud 158 can be positioned between the lighting pattern source 150 and the inspection location of the target object 102 in order to prevent direct illumination of the target object 102.

In some examples, during system configuration, the positions of the one or more image sensing devices 108 can be selected based on the use of simulation tools that are used to render simulated reflection coverage of the target object surface 102 using arbitrary camera models. For example, a simulation environment can be configured with the reflective surface 114' size, orientation and shape, the target part(s), and image sensor device(s) 108 (camera(s)). Each image sensor device can be virtually positioned and reflection simulations are computed. The reflection coverage is saved as a binary texture image (black is not inspectable, white is inspectable) that has a mapping to the target part surface. Coverage textures from multiple cameras can be combined to determine the inspection coverage expectations of a solution. Image sensor device(s) can be moved or added until adequate coverage is achieved for all target parts and part surfaces of interest.

Similarly, selection, placement and image masking of the light pattern source 150 (e.g., projector) can also be determined using simulation tools that consider visibility, pixel size and blur. The relative placement of the light pattern source 150 to the reflecting surface 114' can be optimized to ensure full visibility while minimizing pixel size and blur.

Redundant image sensor devices 108 can be installed and the imaging module 106 such that redundant images can be captured to mitigate loss of inspection coverage when a target object 102 is not correctly aligned or positioned at the predefined inspection location. Further, the use of redundant cameras can enable the inspection system to be easily reconfigured for different part configurations.

Figure 13:
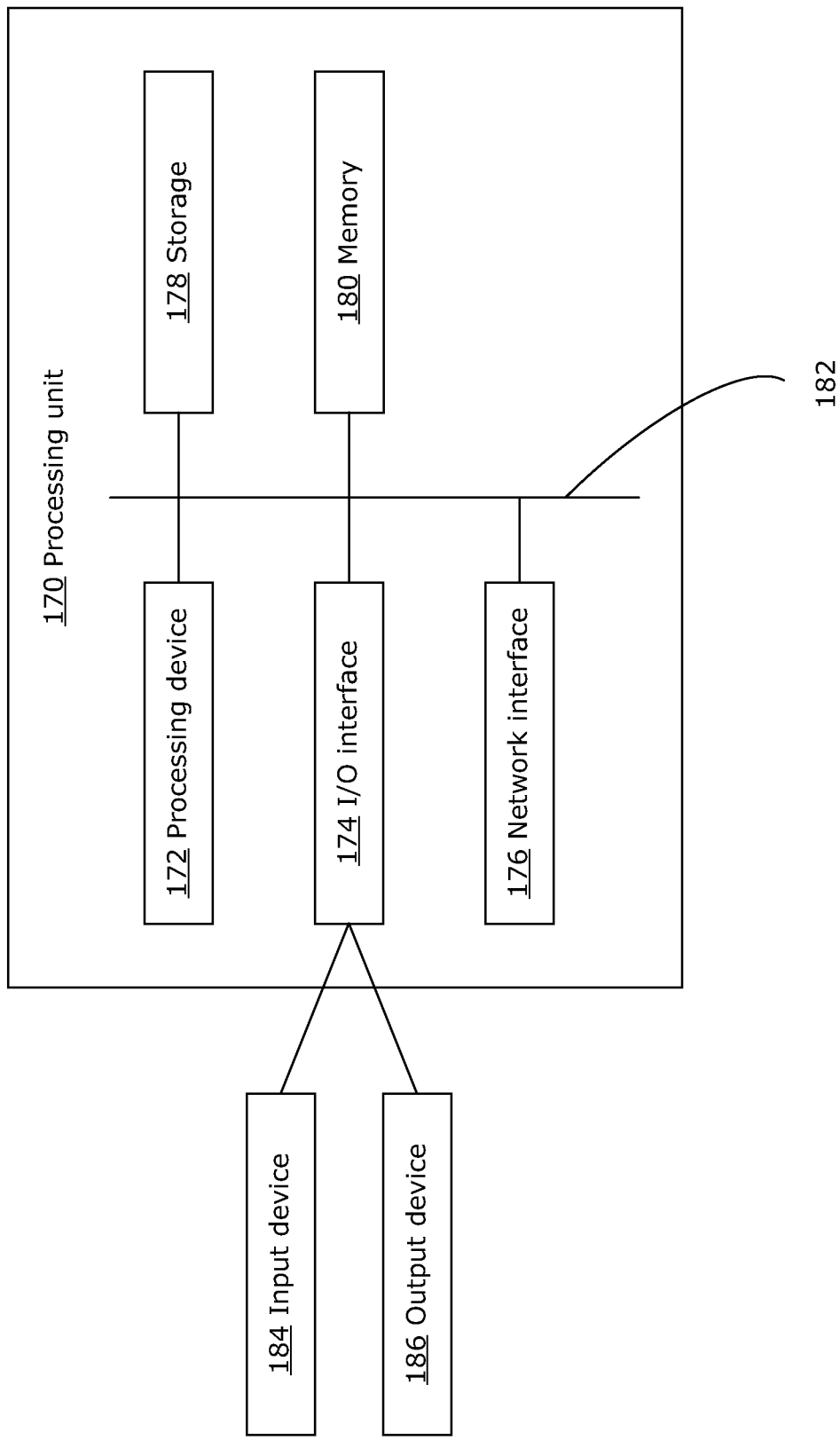
FIG. 13 is a block diagram of a processing unit that can be used to implement modules and units of the system of FIG. 1 according to example embodiments.

FIG. 13 is a block diagram of an example processing unit 170, which may be used to implement one or more of the modules or units of systems 100, 900. Processing unit 170 may be used in a computer device to execute machine executable instructions that implement one or more of the modules or parts of the modules of system 100. Other processing units suitable for implementing embodiments described in the present disclosure may be used, which may include components different from those discussed below. Although FIG. 13 shows a single instance of each component, there may be multiple instances of each component in the processing unit 170.

The processing unit 170 may include one or more processing devices 172, such as a processor, a microprocessor, a general processor unit (GPU), a hardware accelerator, an application-specific integrated circuit (ASIC), a field-programmable gate array (FPGA), a dedicated logic circuitry, or combinations thereof. The processing unit 170 may also include one or more input/output (I/O) interfaces 174, which may enable interfacing with one or more appropriate input devices 184 and/or output devices 186. The processing unit 170 may include one or more network interfaces 176 for wired or wireless communication with a network (e.g with networks 118 or 132).

The processing unit 170 may also include one or more storage units 178, which may include a mass storage unit such as a solid state drive, a hard disk drive, a magnetic disk drive and/or an optical disk drive. The processing unit 170 may include one or more memories 180, which may include a volatile or non-volatile memory (e.g., a flash memory, a random access memory (RAM), and/or a read-only memory (ROM)). The memory(ies) 180 may store instructions for execution by the processing device(s) 172, such as to carry out examples described in the present disclosure. The memory(ies) 180 may include other software instructions, such as for implementing an operating system and other applications/functions. There may be a bus 182 providing communication among components of the processing unit 170, including the processing device(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

Although the present disclosure describes methods and processes with steps in a certain order, one or more steps of the methods and processes may be omitted or altered as appropriate. One or more steps may take place in an order other than that in which they are described, as appropriate. As used herein, statements that a second item (e.g., a signal, value, label, classification, attribute, scalar, vector, matrix, calculation) is "based on" a first item can mean that characteristics of the second item are affected or determined at least in part by characteristics of the first item. The first item can be considered an input to an operation or calculation, or a series of operations or calculations that produces the second item as an output that is not independent from the first item. Where possible, any terms expressed in the singular form herein are meant to also include the plural form and vice versa, unless explicitly stated otherwise. In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of any publications identified in this disclosure are incorporated herein by reference.

The invention claimed is:

1. A computer implemented method for inspecting a manufactured object, comprising:
    positioning the object in a stationary pose relative to a controlled lighting device and an image sensor device;
    projecting a predefined dynamic lighting pattern from the controlled lighting device towards the object;
    capturing, by the image sensor device, lighting responses of the object to the dynamic lighting pattern and generating a set of image frames representing the captured lighting responses;
    processing the set of image frames to generate a processed intensity image that is based on intensity information from a plurality of the image frames; and
    assigning a classification for the object based on the processed intensity image,
    wherein projecting the predefined dynamic lighting pattern comprises reflecting, using a reflecting surface that is directed towards the object, the dynamic lighting pattern as projected by a dynamic pattern lighting source, and the reflecting surface includes a curved surface.

2. The method of claim 1 wherein each image frame in the set of image frames comprises an array of pixels, wherein each aligned group of pixels across the set of image frames indicates a respective light intensity value measured in respect of a corresponding point of the object, and processing the set of image frames to generate the processed intensity image comprises determining a processed intensity value for each aligned group of pixels based on changes in the respective light intensity values indicated within the aligned group of pixels, the processed intensity image comprising an array of the processed intensity values.

3. The method of claim 2 wherein the processed intensity value for each aligned group of pixels is an intensity magnitude value that indicates a difference between a highest light intensity value measured in respect of a corresponding point of the object and the lowest light intensity value measured in respect of the corresponding point.

4. The method of claim 2 wherein the processed intensity value for each aligned group of pixels is an intensity gradient value that indicates a rate of change in intensity values measured in respect of a corresponding point of the object.

5. The method of claim 1 wherein each image frame in the set of image frames comprises an array of pixels, wherein each aligned group of pixels across the set of image frames indicates a respective light intensity value measured in respect of a corresponding point of the object, and processing the set of image frames to generate the processed intensity image comprises generating a first processed intensity image and a second processed intensity image, and:
    generating the first processed intensity image comprises:
        determining an intensity magnitude value for each aligned group of pixels that indicates a difference between a highest light intensity value measured in respect of a corresponding point of the object and the lowest light intensity value measured in respect of the corresponding point, the first processed intensity image comprising an array of the intensity magnitude values; and generating the second processed intensity image comprises: determining an intensity gradient value for each aligned group of pixels that indicates a rate of change in the light intensity values measured in respect of a corresponding point of the object, the second processed intensity image comprising an array of the intensity gradient values;

wherein assigning the classification comprises assigning one or more labels based on the first processed intensity image and the second processed intensity image.

6. The method of claim 1 wherein the dynamic pattern lighting source comprises a display screen or a digital projector that faces the reflecting surface, the reflecting surface being directed towards a surface of interest of the object.

7. The method of claim 1 wherein the predefined dynamic lighting pattern comprises a display pattern that is shifted at a defined rate.

8. The method of claim 1 wherein the display pattern comprises a sequence of different light wavelength pattern elements that comprise one or more of the following: parallel bar elements of different colors; alternating white and black elements; and a set of parallel curved bar elements of different colors.

9. The method of claim 1 wherein capturing the light response of the object comprises measuring light reflected from a surface of the object and/or measuring light transmitted through a region of the object.

10. The method of claim 1 wherein assigning the classification for the object comprises applying a classification model to assign a quality label based on the processed intensity image.

11. A computer implemented method for inspecting a mass produced object, comprising:

projecting a dynamic lighting pattern from a controlled lighting device towards a reflecting surface that includes a curved surface, the reflecting surface reflecting the dynamic lighting pattern towards the object;

capturing a light response of the object, over an inspection period, to the dynamic lighting pattern and generating a set of image frames representing the captured lighting response;

processing the set of image frames to generate an intensity image that is based on intensity information across a plurality of the image frames;

assigning a quality label based on the generated intensity image.

12. The method of claim 11 wherein each image frame in the set of image frames comprises an array of pixels, wherein each aligned group of pixels across the set of image frames indicates a respective light intensity value measured in respect of a corresponding point of the object, and processing the set of image frames to generate the intensity image comprises determining a processed intensity value for each aligned group of pixels based on changes in the respective light intensity values indicated within the aligned group of pixels, the intensity image comprising an array of the processed intensity values.

13. The method of claim 12 wherein the processed intensity value for each aligned group of pixels is includes at least one of:

an intensity magnitude value that indicates a difference between a highest light intensity value measured in respect of a corresponding point of the object and the lowest light intensity value measured in respect of the corresponding point; and an intensity gradient value that indicates a rate of change in intensity values measured in respect of a corresponding point of the object.

* * * * *